(12) United States Patent
Aitharaju et al.

(10) Patent No.: US 11,688,214 B1
(45) Date of Patent: Jun. 27, 2023

(54) COMPOSITE PANEL WITH A WIRELESS, SELF-POWERED OR REMOTELY POWERED SENSING ASSEMBLY

(71) Applicant: GM GLOBAL TECHNOLOGY OPERATIONS LLC, Detroit, MI (US)

(72) Inventors: Venkateshwar R. Aitharaju, Troy, MI (US); Selina Xinyue Zhao, Rochester Hills, MI (US); Andrew J. Galant, Shelby Township, MI (US); Dorel M. Sala, Troy, MI (US); William R. Rodgers, Bloomfield Township, MI (US); Terrence Wathen, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/592,901

(22) Filed: Feb. 4, 2022

(51) Int. Cl.
| | |
|---|---|
| *G07C 5/08* | (2006.01) |
| *G01J 5/04* | (2006.01) |
| *G01J 5/12* | (2006.01) |
| *G01H 11/08* | (2006.01) |
| *H02J 50/20* | (2016.01) |
| *G06K 19/07* | (2006.01) |
| *H02J 50/00* | (2016.01) |
| *H02N 2/18* | (2006.01) |
| *H02J 7/34* | (2006.01) |

(52) U.S. Cl.
CPC ........... *G07C 5/0808* (2013.01); *G01H 11/08* (2013.01); *G01J 5/041* (2013.01); *G01J 5/12* (2013.01); *G06K 19/0704* (2013.01); *H02J 7/345* (2013.01); *H02J 50/001* (2020.01); *H02J 50/20* (2016.02); *H02N 2/186* (2013.01)

(58) Field of Classification Search
CPC .......... H02J 50/001; H02J 50/20; H02N 2/00; G07C 5/00; G01H 11/00; G01J 5/00; G06K 19/00
See application file for complete search history.

(56) References Cited

U.S. PATENT DOCUMENTS

| | | | |
|---|---|---|---|
| 7,819,462 B1 | 10/2010 | Owens et al. | |
| 8,033,592 B2 | 10/2011 | Hsu et al. | |
| 2006/0106147 A1 | 5/2006 | Fasulo et al. | |
| 2006/0199890 A1 | 9/2006 | Fasulo et al. | |
| 2007/0299185 A1 | 12/2007 | Ottaviani et al. | |
| 2009/0045195 A1* | 2/2009 | Djerf | E04B 1/34846 220/62.11 |
| 2009/0047453 A1* | 2/2009 | Folaron | F41H 5/007 428/221 |
| 2009/0189781 A1* | 7/2009 | Taylor | G08G 1/167 340/903 |
| 2010/0098925 A1 | 4/2010 | Fasulo et al. | |

(Continued)

*Primary Examiner* — Rexford N Barnie
*Assistant Examiner* — Joseph N Inge

(57) ABSTRACT

A composite panel for a vehicle includes a plurality of layers bonded together by resin. A sensing assembly is arranged between at least two of the plurality of layers. The sensing assembly includes at least one of a piezoelectric layer to sense vibration of the composite panel when installed on the vehicle and a thermopile configured to sense changes in temperature of the composite panel when installed on the vehicle. The sensing assembly further includes a transmitter configured to transmit data to the vehicle based on an output of the at least one of the piezoelectric layer and the thermopile.

18 Claims, 10 Drawing Sheets

(56) References Cited

U.S. PATENT DOCUMENTS

| | | |
|---|---|---|
| 2011/0121225 A1 | 5/2011 | Posudievsky et al. |
| 2018/0080890 A1* | 3/2018 | Potyrailo ................ H04Q 9/00 |
| 2018/0114382 A1* | 4/2018 | Courter ................ G01R 31/008 |
| 2021/0008932 A1* | 1/2021 | Stowell ................ H01Q 1/2241 |
| 2021/0229327 A1 | 7/2021 | Aitharaju et al. |

* cited by examiner

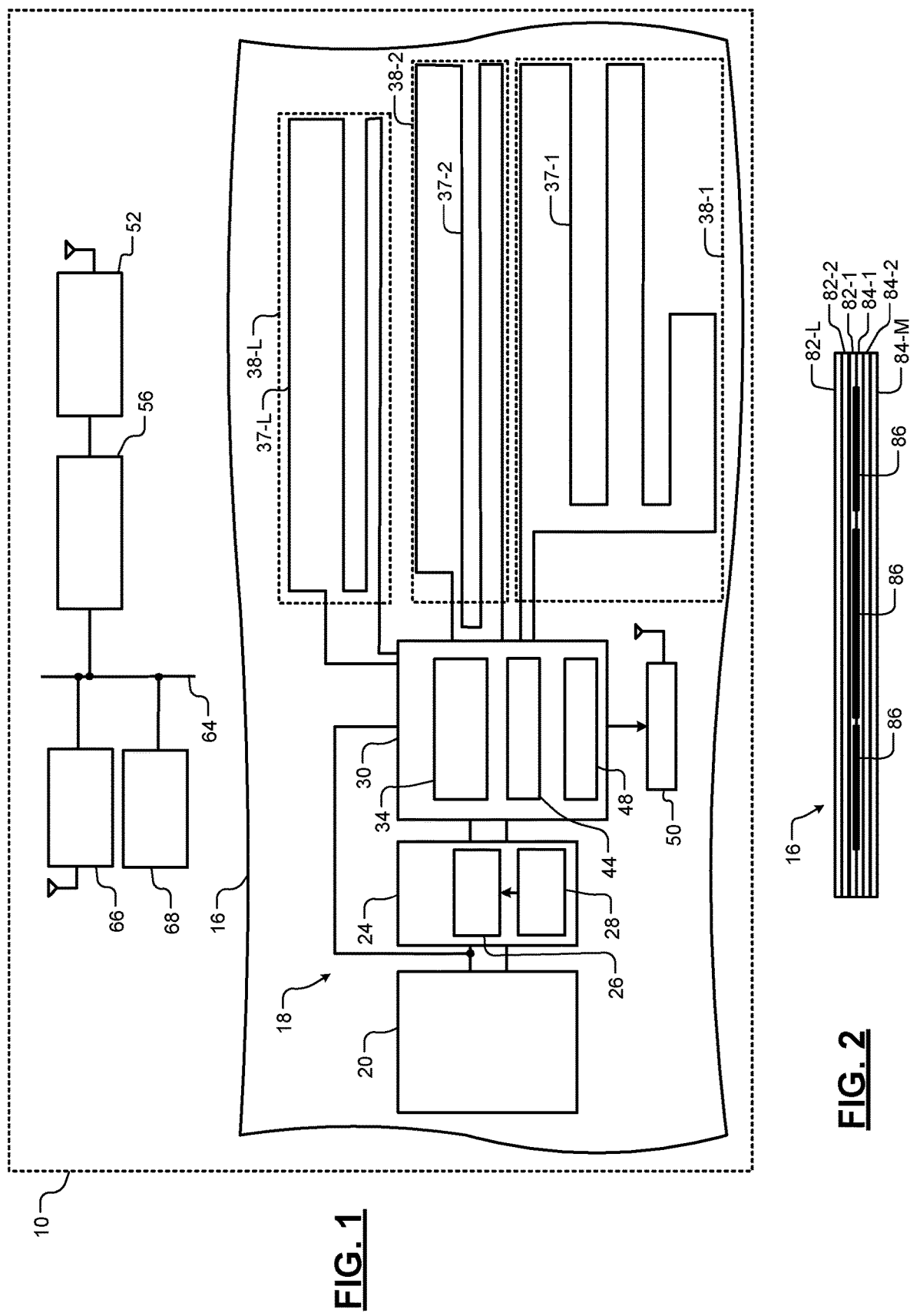

COMPOSITE PANEL WITH A WIRELESS, SELF-POWERED OR REMOTELY POWERED SENSING ASSEMBLY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to composite panels, and more particularly to a composite panel with a wireless, self-powered or remotely-powered sensing assembly.

Composite panels are typically made by arranging one or more layers of fiberglass, carbon fiber and/or other fiber materials in a predetermined orientation, impregnating the layers with resin and heating/curing the composite panel. Composite panels have high strength and low weight. Some composite panels are arranged in areas that are subjected to damage. For example, composite panels may be arranged as structural members, in underbody locations or as body panels.

Most vehicle operators do not regularly inspect underbody panels since they are arranged in inconvenient locations. The composite panels may be damaged due to impact or thermal events. While physical inspection by a skilled technician can be performed at a dealership, that approach is inconvenient since the vehicle needs to be brought to a dealership for service and relatively expensive since the damage may not be visible or easily diagnosed.

SUMMARY

A composite panel for a vehicle includes a plurality of layers bonded together by resin. A sensing assembly is arranged between at least two of the plurality of layers. The sensing assembly includes at least one of a piezoelectric layer to sense vibration of the composite panel when installed on the vehicle and a thermopile configured to sense changes in temperature of the composite panel when installed on the vehicle. The sensing assembly further includes a transmitter configured to transmit data to the vehicle based on an output of the at least one of the piezoelectric layer and the thermopile.

In other features, the sensing assembly further comprises a comparing circuit in communication with the at least one of the piezoelectric layer and the thermopile and configured to compare an output of the at least one of the piezoelectric layer and the thermopile to one or more predetermined thresholds, wherein the transmitter is configured to selectively transmit the data to the vehicle in response to the comparison.

In other features, a controller includes the comparing circuit. L conductive loops are arranged between at least two of the plurality of layers and in communication with the controller, where L is an integer greater than zero.

In other features, the controller further comprises a time domain reflectometry (TDR) circuit configured to determine a distance from the controller to damage to at least one of the L conductive loops. The controller includes a loop sensor configured to sense a parameter of the L conductive loops. The parameter is selected from a group consisting of current, voltage and resistance.

In other features, the controller selectively identifies damage to at least one of the L conductive loops in response to the parameter. An energy harvesting circuit is configured to harvest power from the at least one of the piezoelectric layer and the thermopile. The energy harvesting circuit is configured to supply the power to the energy storage device. The energy storage device comprises at least one of a battery and a supercapacitor. A reference generator is configured to generate the one or more predetermined thresholds.

In other features, a radio frequency identification (RFID) circuit configured to receive power from a remote transmitter. An energy harvesting circuit is configured to harvest power from the RFID circuit and to store the power in the energy storage device. The transmitter is connected to the energy storage device.

A composite panel for a vehicle includes a plurality of layers bonded together by resin. A sensing assembly, arranged between at least two of the plurality of layers, comprises a radio frequency identification (RFID) circuit configured to receive power from a remote transmitter. An energy harvesting circuit is configured to harvest the power from the RFID circuit and to store the power in an energy storage device. A controller communicates with the energy storage device and at least one of the piezoelectric layer and the thermopile and is configured to compare an output of the at least one of the piezoelectric layer and the thermopile to one or more predetermined thresholds. A transmitter communicates with the controller and the energy harvesting circuit and is configured to selectively transmit a message to the vehicle in response to the comparison.

In other features, L conductive loops are arranged between at least two of the plurality of layers and in communication with the controller, where L is an integer greater than zero. The controller includes a loop sensor configured to sense a parameter of the L conductive loops. The parameter is selected from a group consisting of current, voltage and resistance. The controller selectively identifies damage to at least one of the L conductive loops in response to the parameter. The controller further comprises a time domain reflectometry (TDR) circuit configured to determine a distance from the controller to damage to at least one of the L conductive loops. The energy storage device comprises at least one of a battery and a supercapacitor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of an example of a composite panel with a sensing assembly including a piezoelectric layer according to the present disclosure;

FIG. 2 is a side cross-sectional view of an example of the composite panel with the sensing assembly according to the present disclosure;

In the drawings, reference numbers may be reused to identify similar and/or identical elements.

DETAILED DESCRIPTION

A composite panel according to the present disclosure includes an embedded sensing assembly to actively sense impact events and/or thermal events during operation of the vehicle. The sensing assembly includes a transmitter or transceiver to send data relating to the impact events and/or the thermal events to a receiver in communication with a vehicle data bus. The data can be stored locally, used to trigger a fault or other diagnostic trouble code, and/or transmitted remotely from the vehicle using a telematics system.

The sensing assembly is embedded between layers of the composite panel.

The sensing assembly adds a small amount of weight (typically less than 2 wt %) while significantly improving detection of damage to the composite panel due to impact and/or thermal events. The sensing assembly can be self-powered using a piezoelectric layer that generates voltage in response to vibration and/or a thermopile that generates voltage in response to heat. In some examples, the sensing assembly includes a radio frequency identification (RFID) circuit that wirelessly receives power from a remote transmitter associated with the vehicle, a service tool and/or another device.

The sensing assembly may include an energy harvesting circuit that harvests power output by the piezoelectric layer, the thermopile and/or the RFID circuit. The sensing assembly may include an energy storing device to store power. In some examples, the energy storing device includes a battery and/or a supercapacitor, although other devices can be used. The sensing assembly can also include one or more conductive loops that are arranged in areas of the composite panel that are to be monitored for damage. The sensing assembly includes a loop sensor configured to detect damage to the one or more conductive loops by sensing changes in current, voltage, resistance or other parameters (those occurring when one or more of the conductive loops are damaged). In some examples, the sensing assembly includes a time domain reflectometry (TDR) circuit configured to determine a distance from the TDR circuit to a damaged portion of one or more of the conductive loops.

Figure 3:
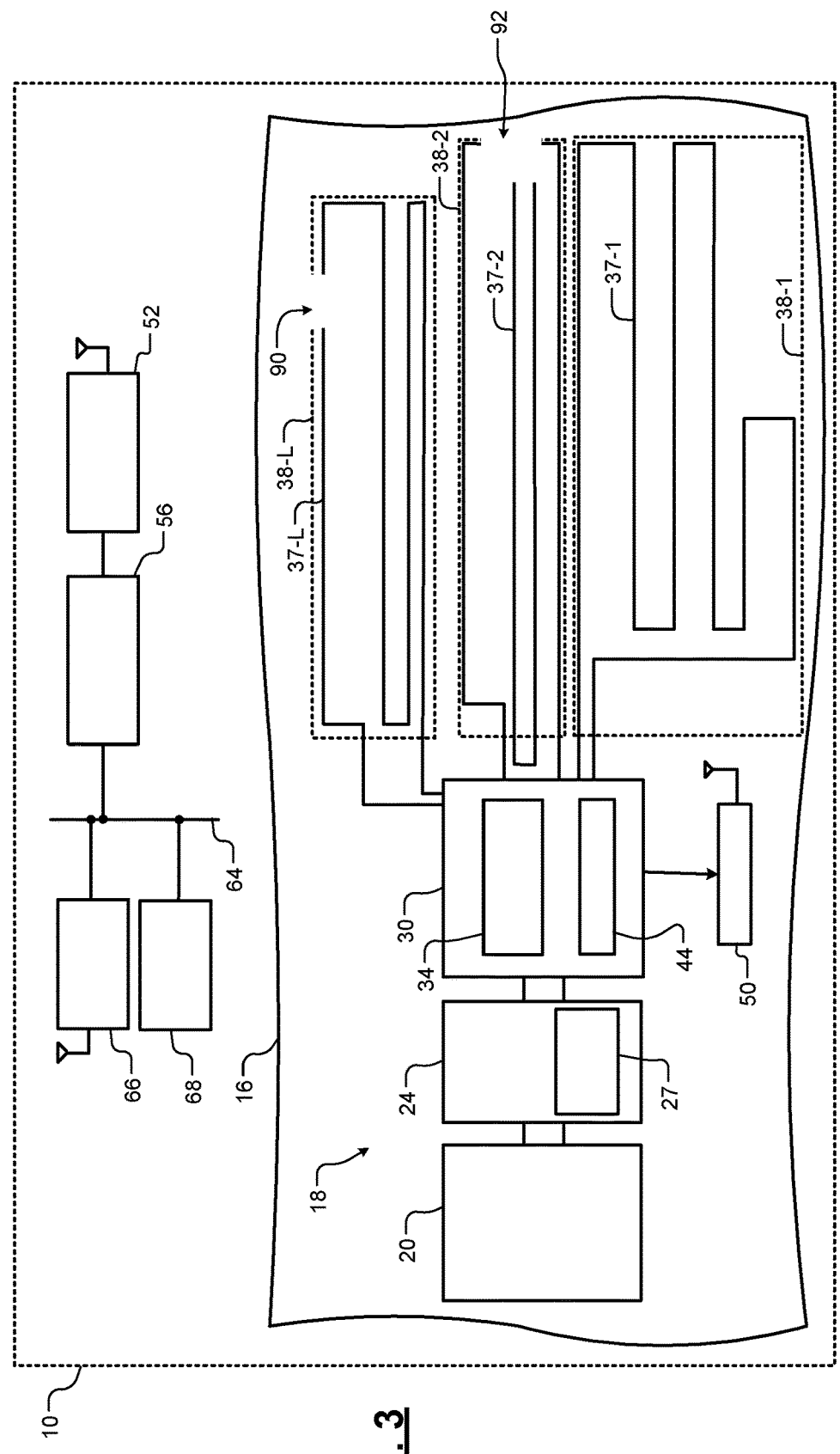
FIGS. 3 to 4B are functional block diagrams of examples of composite panels with integrated sensing assemblies including piezoelectric layers according to the present disclosure.

Referring now to FIGS. 1-3, a vehicle 10 includes a composite panel 16 with a sensing assembly 18. In FIG. 1, the sensing assembly 18 is embedded in the composite panel 16. For example, the sensing assembly 18 is laminated between two or more layers of the composite panel 16.

The sensing assembly 18 includes a piezoelectric layer 20 that outputs voltage in response to vibration of the composite panel 16. In some examples, the piezoelectric layer 20 is selected from a group consisting of polyvinylidene fluoride (PVDF), perovskite zirconate titanate (PZT), and/or lead magnesium niobate/lead titanate (PMN-PT), although other piezoelectric materials can be used.

In some examples, the piezoelectric layer 20 outputs voltage that increases with the magnitude of vibration. Typical vibration that is encountered during normal operation corresponds to lower voltage levels. Higher levels of vibration that occur in response to damage events correspond to higher output voltage levels. The voltage/power output by the piezoelectric layer 20 can be used to power the sensor assembly and the magnitude of the voltage can be used to identify impact events.

In some examples, the piezoelectric layer 20 outputs the voltage to an energy storage device 24. Since operation of the vehicle will cause vibration during normal operation, the piezoelectric layer 20 generates power that is stored by the energy storage device 24. In some examples, the energy storage device 24 includes a battery 26 (FIG. 1) and/or a super-capacitor (SC) 27 (FIG. 3). If the energy storage device 24 includes a battery, the energy storage device 24 may also include a charger 28 that charges the battery 26. In other words, the charger 28 uses the voltage output of the piezoelectric layer 20 to charge the battery 26. Alternately, the battery 26 may be wirelessly or inductively charged in a manner similar to a cellphone, remotely using radio frequency identification (RFID) circuits, and/or in another manner using an inductive wire loop.

The energy storage device 24 provides power to a controller 30 including a comparing circuit 34. The output of the piezoelectric layer 20 is also output to the comparing circuit 34. The comparing circuit 34 compares the output of the piezoelectric layer 20 to one or more predetermined thresholds corresponding to one or more impact levels. If the output of the piezoelectric layer 20 is greater than one or more of the predetermined thresholds, the controller 30 can take further suitable action. For example, at lower impact levels, the vehicle 10 can notify the driver through the infotainment display and take no further action. At higher impact levels, the vehicle 10 notifies the driver and/or sends a message to the manufacturer, alters operation of the vehicle and/or takes other action.

The controller 30 is further connected to L conductive loops 37-1, 37-2, . . . , and 37-L (collectively L conductive loops 37) arranged between layers of the composite panel 16 (where L is an integer greater than zero). In some examples, each of the L conductive loops 37 is associated with a different area (L areas 38-1, 38-2, . . . , and 38-L (collectively areas 38) are shown) of the composite panel.

The controller 30 includes a loop sensor 44 to sense changes in the L conductive loops 37 corresponding to damage. For example, the loop sensor 44 senses a parameter of the L conductive loops to determine a damage state of the loop. In other words, the loop sensor 44 can include a voltage, current or resistive sensor to sense a voltage or current flowing in the loop or a resistance of the loop. In other words, if the conductive loop is damaged, the voltage, current or resistance of the conductive loop changes. A voltage or current input at one end of the loop will not be received at the other end of the loop. The resistance of the conductive loop will increase from zero to a non-zero value (e.g. infinite) if the conductive loop is damaged.

In other examples, the loop sensor 44 sends a digital code on one end of each conductive loop, senses signals received at the other end of the conductive loop, compares the two signals and determines a state of the conductive loop based on the comparison. While the loop sensor 44 is shown integrated with the controller 30, the loop sensor 44 can be implemented separately from the controller 30.

In FIG. 1, the controller 30 further includes a time domain reflectometry (TDR) circuit 48 that identifies a distance from the controller 30 to a location of a break in one of the L conductive loops 37. TDR can be performed from both ends of the L conductive loops 37 to provide further information.

In some examples, the controller 30 initiates TDR testing in response to the comparing circuit 34. In other examples, the TDR testing is performed in response to an event and/or on a periodic basis independent of the output of the comparing circuit 34. The TDR circuit 48 generates a test signal on the conductive loop and determines a distance to an open circuit by measuring the time required for the reflection to return from the break/damage in the conductive loop and/or the magnitude of the reflected signal. In other examples such as in FIG. 2, the TDR circuit is omitted.

The sensing assembly 18 further includes a transmitter 50 (or transceiver for two-way communication) to transmit data to a receiver 52. When the loop sensor 44 determines that one or more of the L conductive loops 37 are broken due to a damage event, the controller 30 causes a transmitter 50 to transmit a signal to the vehicle 10. The transmitter 50 may also be used to send other data to the vehicle 10. For example, the data may include results of the comparing circuit 34, results of TDR testing, information relating to damage to one or more of the L conductive loops 37, and/or location or distance information regarding breaks in one or more of the L conductive loops 37.

In some examples, the receiver 52 receives the signal from the transmitter 50 and outputs a signal to a controller 56 in communication with a vehicle bus 64. In some examples, the controller 56 sends the data to a telematics controller 66 or to a vehicle controller 68. In some examples, the vehicle controller 68 sets a diagnostic code and/or alerts a driver. In other examples, the telematics controller 66 wirelessly sends the data (via a cellular or satellite system and a distributed communications system such as the Internet (not shown)) to a remote server associated with the manufacturer or another service.

In some examples, the L conductive loops 37 comprise insulated wires. In other examples, the L conductive loops 37 comprise uninsulated wire or conductive ink printed on one or more of the layers of the composite panel 16.

In FIG. 2, the composite panel 16 with the sensing assembly 18 is shown. The composite panel 16 includes L first layers 82-1, 82-2, . . . , and 82-L (collectively L first layers 82) and M second layers 84-1, 84-2, . . . , and 84-M (collectively M second layers), where L and M are integers greater than zero. Components 86 of the sensing assembly are shown sandwiched between the L first layers 82 and the M second layers 84.

In some examples, the L first layers 82 and the M second layers 84 are made of the same material such as carbon fiber, fiberglass or another suitable material. In other examples, the layer 82-1 and the layer 84-1 are made of a different material than the rest of the layers. For example, the layer 82-1 and the layer 84-1 are made of fiberglass (or another insulating/non-conducting material) and the remaining layers are made of carbon fiber. Since carbon fiber is conducting, the insulating/non-conducting layers adjacent to the conductive loops and/or integrated circuits provide insulation to prevent short circuits. Thus, the insulating/non-conducting layers can be used to provide insulation relative to the conducting outer layers of the composite panel if carbon fiber or another conducting material is used.

In FIG. 3, the energy storage device 24 includes a super-capacitor (SC) 27 that stores power output by the piezoelectric layer 20. Power stored in the super-capacitor (SC) 27 is used to supply the controller 30 and the transmitter 50. While the TDR circuit is omitted in this example, the TDR circuit can be used. Despite the lack of TDR functionality, the controller 30 can provide some information about the locations of damage by using the loop sensor 44 to identify the loops and corresponding loop area(s) where damage 90 and 92 occurred.

The circuits in FIGS. 1 to 3 can be used in other ways. In the preceding examples, the piezoelectric layer and the loop sensor can both identify crash events and/or physical damage to the conductive loops (and therefore the composite panel). However, in other examples, the piezoelectric layer can be used to solely power the sensing assembly while the loop sensor detects damage due to the impact events. Alternately, the loop sensor and conductive loops can be omitted and damage from the impact events can be sensed solely based on the output of the piezoelectric layer.

Figure 4A:
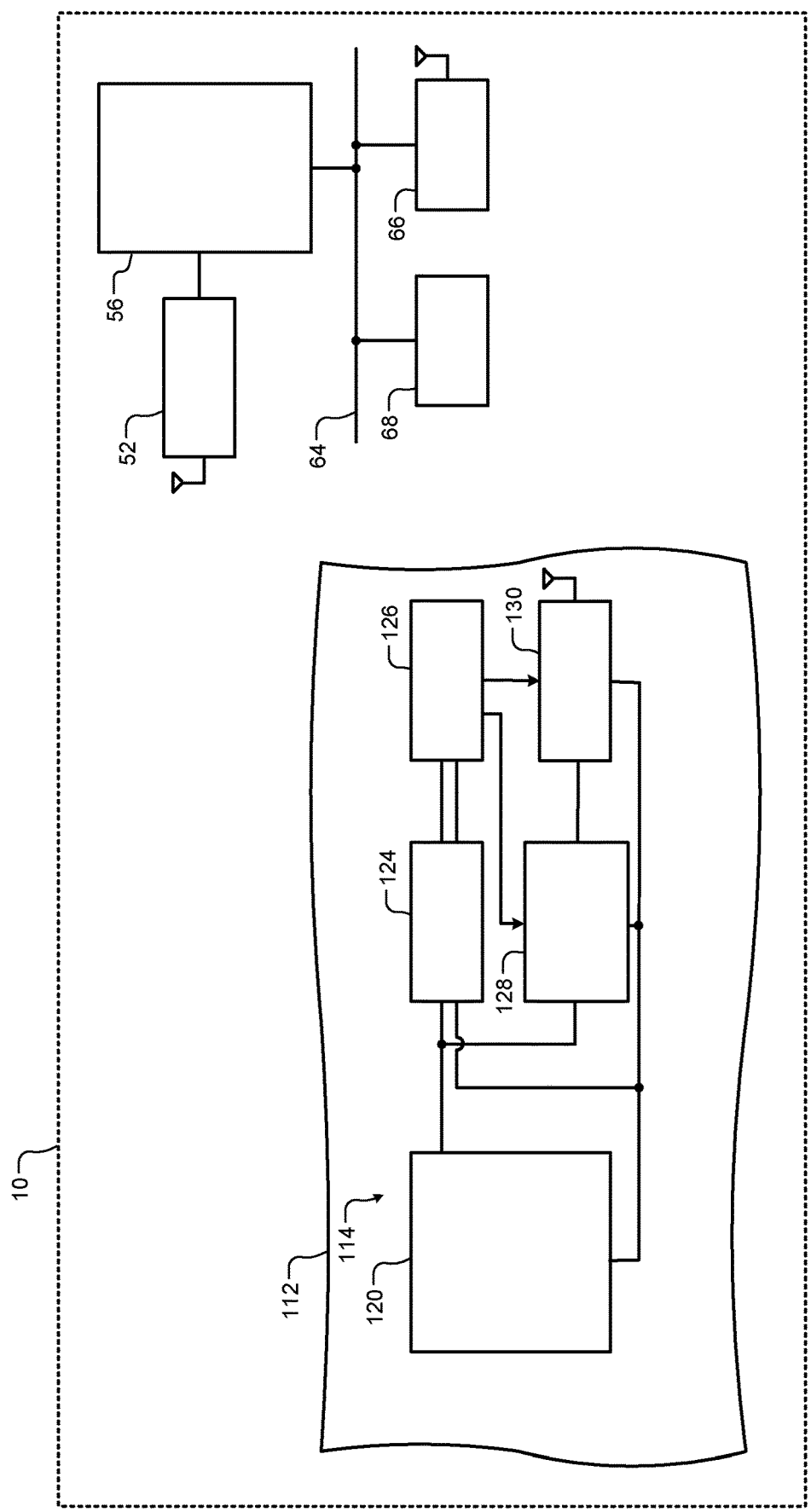
Figure 4B:
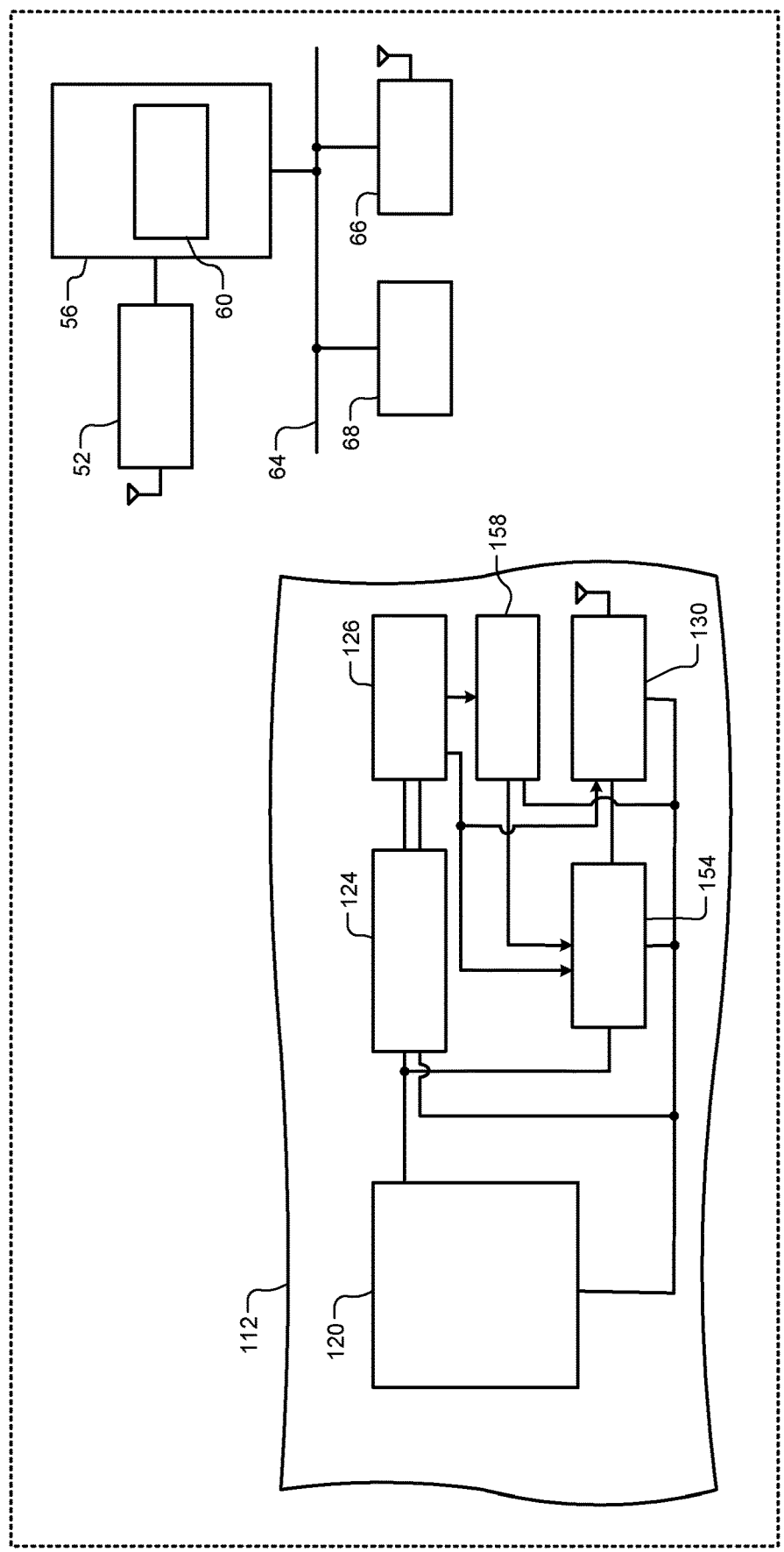

Referring now to FIG. 4A to 4B, other examples of composite panels with piezoelectric layers are shown. In FIG. 4A, a composite panel 112 includes a sensing assembly 114 with a piezoelectric layer 120. An output of the piezoelectric layer 120 is input to an energy harvesting circuit 124. The energy harvesting circuit 124 harvests power output by the piezoelectric layer 120 and outputs the power to an energy storage device 126 (such as a battery and/or supercapacitor). In some examples, the energy harvesting circuit 124 comprises an integrated circuit (IC).

The output of the piezoelectric layer 120 is also input to an A/D converter and comparator 128. The A/D converter samples the output of the piezoelectric layer 120 and converts the analog signal into a digital signal representing a current output level of the piezoelectric layer 120. The comparator of the A/D converter and comparator 128 compares the digital level to a predetermined threshold stored in the A/D converter and comparator 128. If the digital level is greater than the predetermined threshold corresponding to a likely impact event, the A/D converter and comparator 128 causes a transmitter 130 to transmit a signal to the vehicle as described above. In other examples, multiple thresholds are used and/or the magnitude is sent to the vehicle 10 for evaluation. The energy storage device 126 provides power to various components of the sensing assembly 114 such as the A/D converter and comparator 128 and the transmitter 130.

Referring now to FIG. 4B, the A/D converter and comparator 128 can be replaced by a comparator 154 and a reference generator 158 that operate without converting from analog to digital. In some examples, the reference generator 158 generates one or more predetermined thresholds corresponding to one or more impact levels. The comparator 154 compares the output of the piezoelectric layer 120 to the one or more predetermined thresholds and generates one or more signals in response to the comparisons. If a single threshold corresponding to an impact event is used, the comparator 154 makes the comparison and triggers the transmitter 130 when the predetermined reference is exceeded. The energy storage device 126 provides power to various components of the sensing assembly 114 such as the comparator 154, the reference generator 158 and the transmitter 130.

Figure 5:
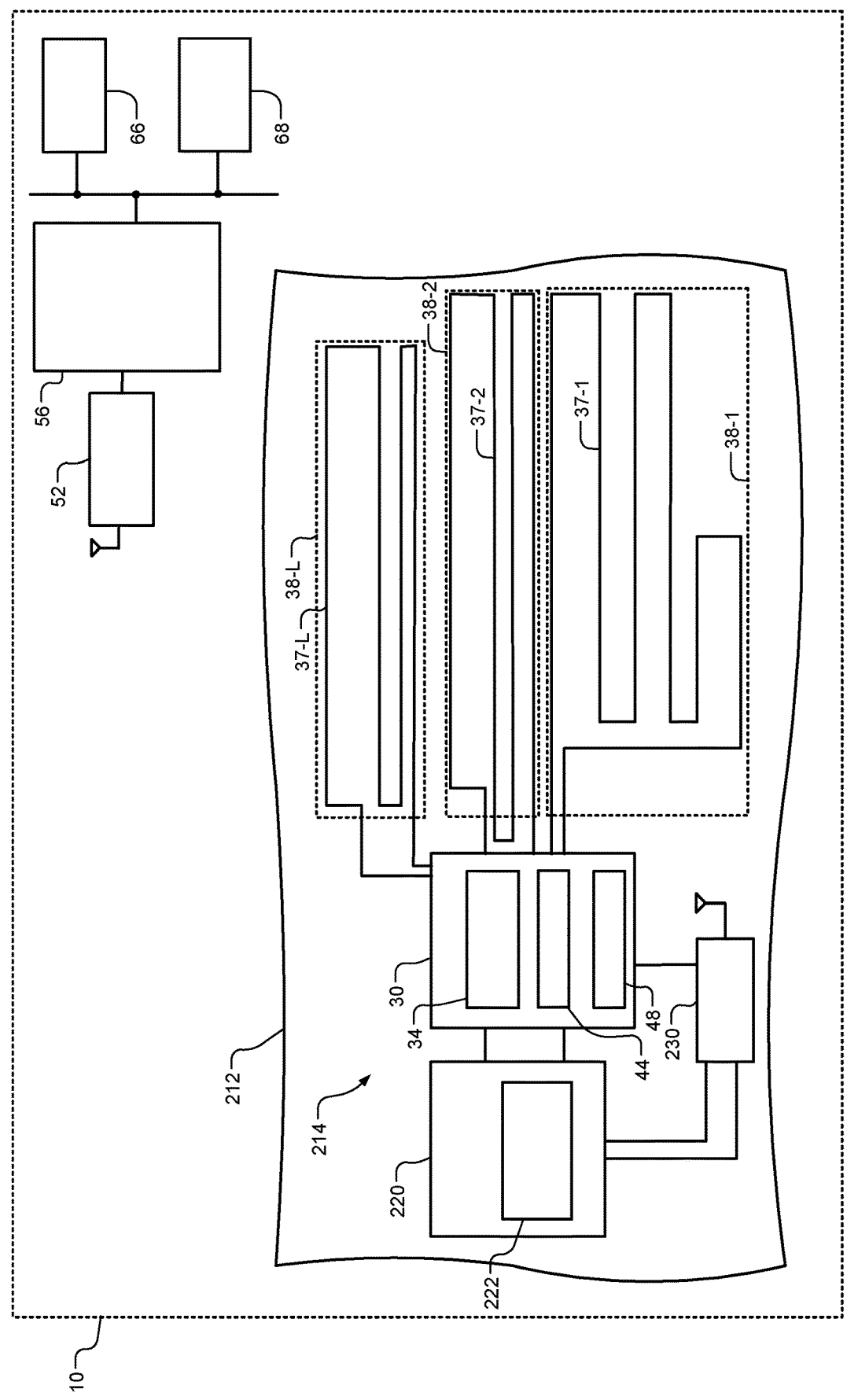
FIG. 5 is a functional block diagram of an example of a composite panel with a sensing assembly including an energy harvesting device according to the present disclosure.

Referring now to FIG. 5, the vehicle 10 includes a composite panel 212 including a sensing assembly 214. The sensing assembly 214 includes an energy harvesting circuit 220 including an energy storage circuit 222 such as a capacitor, a supercapacitor or a battery. While the energy storage circuit 222 is shown integrated with the energy harvesting circuit 220, the energy storage circuit 222 can be implemented separately. The energy harvesting circuit 220 is connected to a radio frequency identification circuit (RFID) circuit 230 including an antenna.

The RFID circuit 230 receives power wirelessly from the vehicle 10 (via the transceiver 52) and outputs the power to the energy harvesting circuit 220. The energy harvesting circuit 220 harvests the power and optionally stores the power in the energy storage circuit 222. The power in the energy storage circuit 222 is used to power the controller 30. The loop sensor 44 senses breakage of the conductive loops and the TDR circuit 48 identifies a distance to the location of the break.

Figure 6:
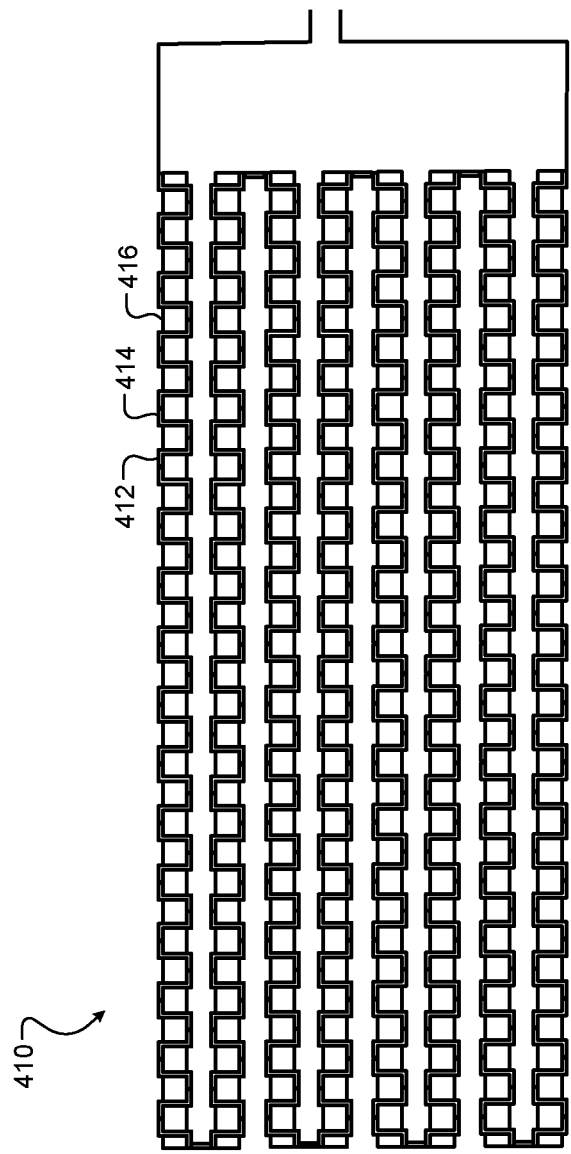
FIG. 6 is a functional block diagram of an example of a thermopile according to the present disclosure.

Referring now to FIG. 6, a thermopile 410 is shown to include a plurality of thermocouples connected in series, parallel or a combination thereof. Each thermocouple comprises an electrical device with two dissimilar electrical conductors forming an electrical junction. Each of the thermocouples of the thermopile 410 produces an output voltage due to the Seebeck effect. The output voltage is temperature dependent.

The thermopile 410 includes a thermal resistance layer 416 and first and second sets of electrical conductors 412 and 414 that are made of different materials and that are connected in series in an alternating fashion as shown to form a plurality of thermocouples. In other words, the thermopile 410 includes a plurality of thermocouples connected in series as thermocouple pairs with a junction located on either side of a thermal resistance layer 416. The output of the thermocouple is a voltage that is directly proportional to the temperature difference across the thermal resistance layer 416 and to the heat flux through the thermal resistance layer. Adding more thermocouple pairs in series increases the magnitude of the voltage output. The output of the thermopile 410 can be used to detect thermal events and/or to power the sensor assembly.

Figure 7:
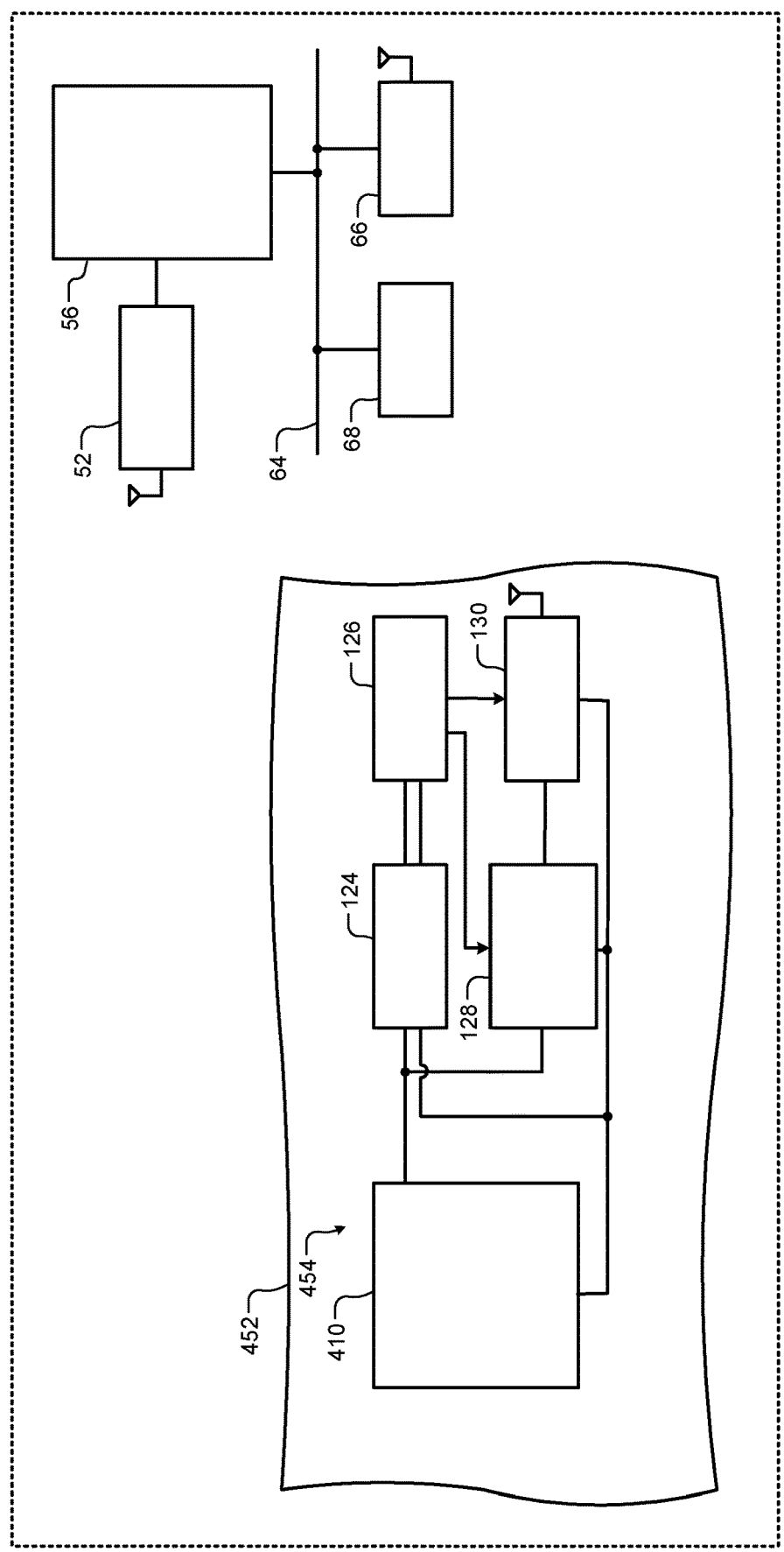
FIG. 7 is a functional block diagram of an example of a composite panel with a sensing assembly including a thermopile according to the present disclosure.

Referring now to FIG. 7, the vehicle 10 includes a composite panel 452 including a sensing assembly 454 including the thermopile 410. An output of the thermopile 410 is input to the energy harvesting circuit 124. The energy harvesting circuit 124 harvests power output by the thermopile 410 and supplies power to the energy storage device 126 (such as a battery and/or supercapacitor).

The output of the thermopile 410 is also input to the A/D converter and comparator 128 to allow detection of thermal events. The A/D converter portion of the A/D converter and comparator 128 samples the output of the thermopile 410 and converts the analog signal into a digital signal representing a temperature of the composite panel. The comparator of the A/D converter and comparator 128 compares the temperature signal output by the thermopile 410 to a predetermined temperature threshold stored in the A/D converter and comparator 128 or another device. If the temperature signal is greater than the predetermined temperature threshold corresponding to a thermal event, the A/D converter and comparator 128 causes the transmitter 130 to transmit a signal to the vehicle 10 as described above. In other examples, the A/D converter and comparator 128 compares the digital level to a plurality of predetermined temperature thresholds corresponding to different thermal events. As can be appreciated, the arrangement shown in FIG. 4B (using a comparator and reference generator) can also be used.

Figure 8:
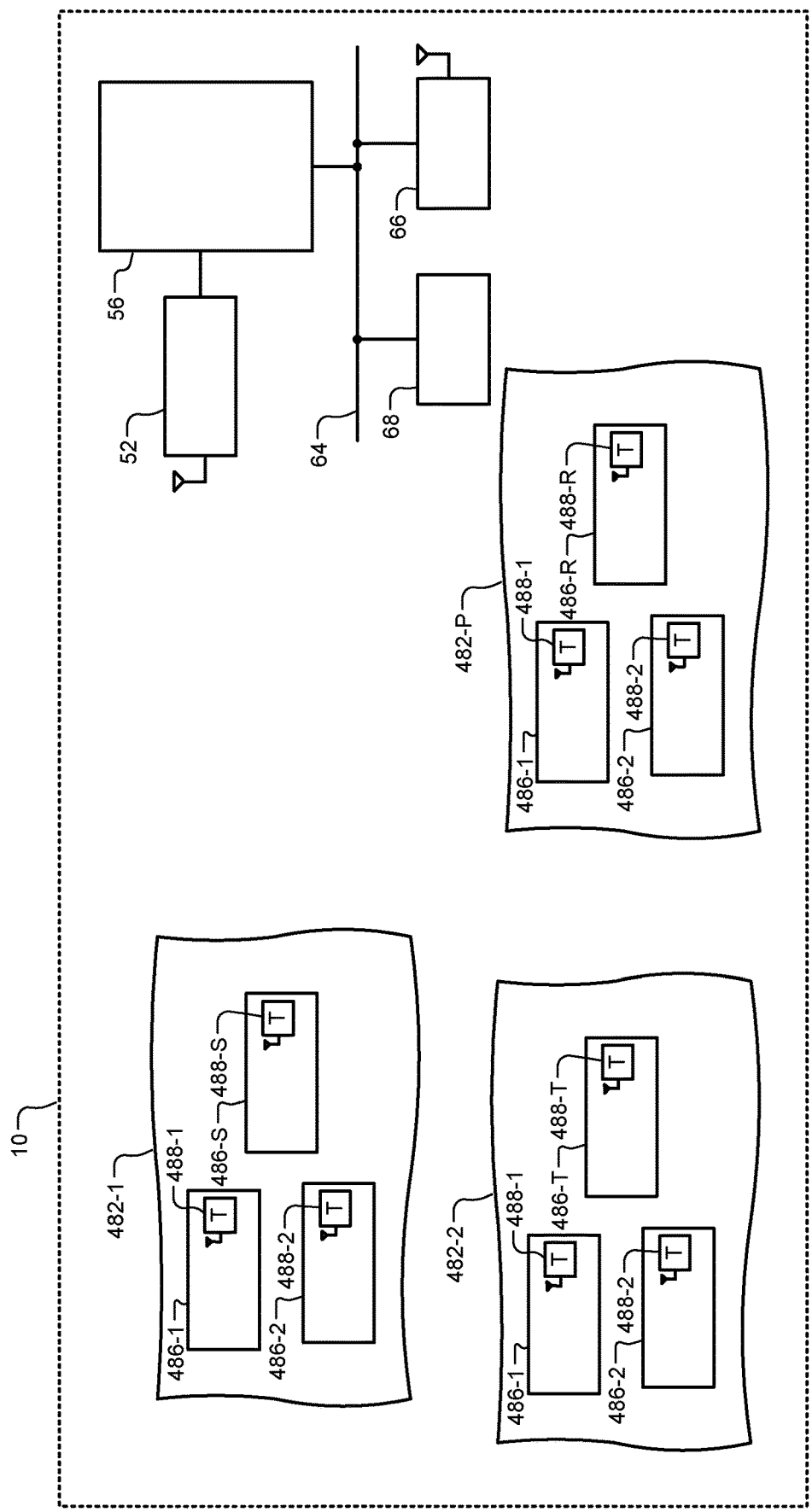
FIG. 8 is a functional block diagram of an example of a vehicle including a plurality of composite panels each including one or more sensing assemblies according to the present disclosure.

Referring now to FIG. 8, the vehicle 10 includes one or more composite panels 482-1, 482-2, ..., and 482-P (where P is an integer greater than zero) (collectively the composite panels 482). Each of the composite panels 482 includes one or more embedded sensing assemblies. The composite panel 482-1 includes one or more sensing assemblies 486-1, 486-2, ..., and 486-S (where S is an integer greater than zero) (collectively sensing assemblies 486) each including a transmitter or transceiver 488-1, 488-2, ..., and 488-S (collectively transceivers 488). The composite panel 482-2 includes one or more sensing assemblies 486-1, 486-2, ..., and 486-T (where T is an integer greater than zero) each including a transmitter or transceiver 488-1, 488-2, ..., and 488-T. The composite panel 482-P includes one or more sensing assemblies 486-1, 486-2, ..., and 486-R (where P and R are integers greater than zero) each including a transmitter or transceiver 488-1, 488-2, ..., and 488-R.

Figure 9:
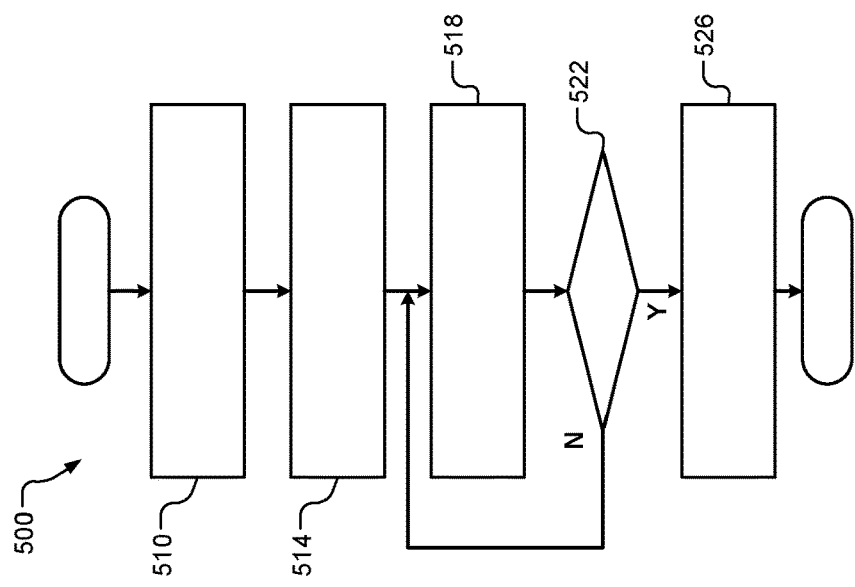

Referring now to FIG. 9, a method 500 for operating the sensing assemblies is shown. At 510, a sensing assembly is embedded in a composite panel. In other words, the components are arranged on one the layers of the composite panel and connected. The conductive loops are laid out and connected to the controller. The other layers of the composite panel are arranged on the components and the conductive loops, the layers are impregnated with resin and the laminate is heated to cure the resin.

At 514, the composite panel is mounted on a vehicle. The sensing assembly is powered by the piezoelectric layer, the thermopile, the RFID circuits and/or the energy storage device (battery or SC). The sensing assembly generates an RF signal in response to a damage impact event or a thermal event. At 518, transmitter signals from the sensing assembly are monitored by the vehicle. At 522, the method determines whether a signal corresponding to an impact event or a thermal event is received from the sensing assembly. In some examples, additional data relating to the location of the damage, the magnitude of the impact and/or the temperature of the thermal event are sent to the vehicle. If 522 is true, the method sets a fault at 526. The damage to the vehicle is inspected and repairs are made if needed.

Figure 10:
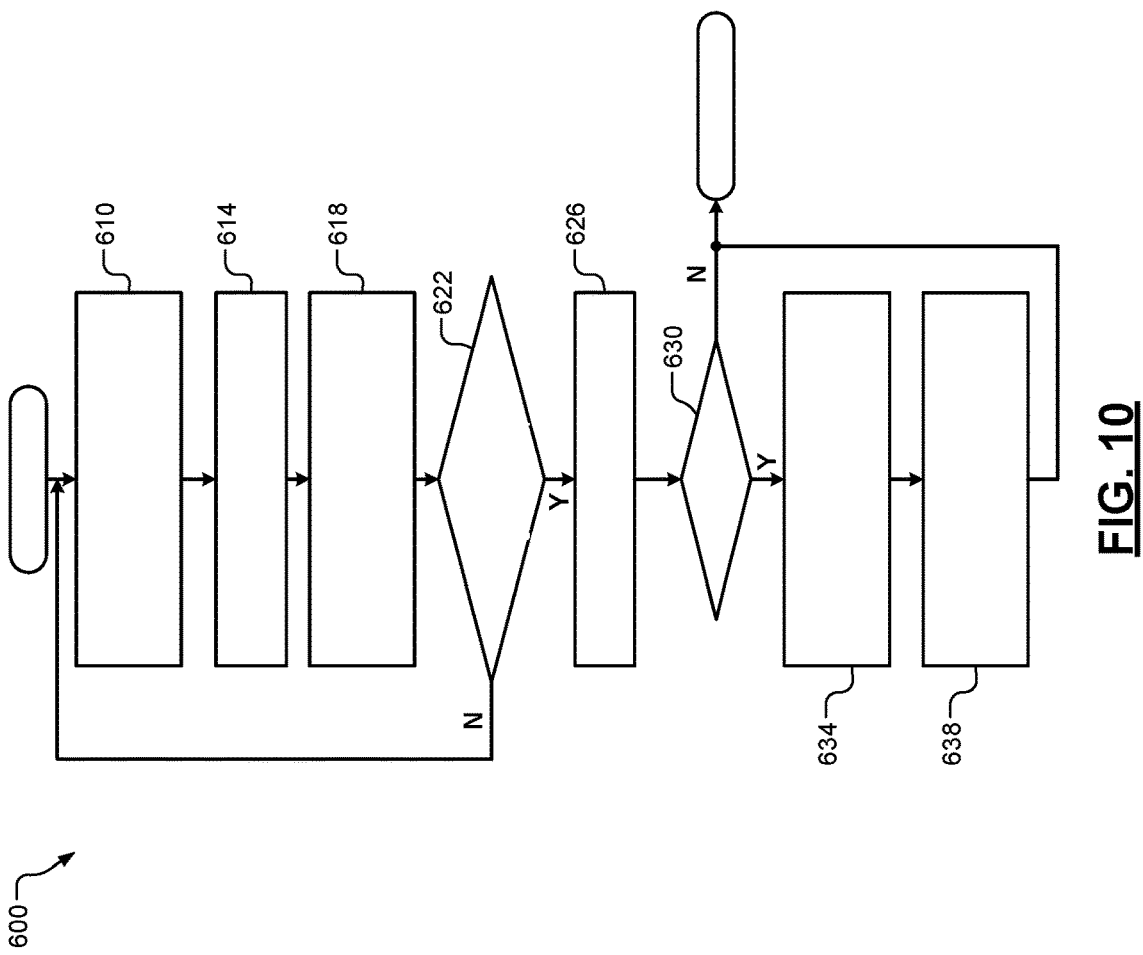
FIGS. 9 to 11 are flowcharts illustrating methods for operating the sensing assemblies according to the present disclosure.

Referring now to FIG. 10, a method 600 for operating a sensing assembly in a composite panel is shown. At 610, power is generated using a piezoelectric device, a thermopile, and/or an RFID circuit. At 614, power is harvested and/or stored. At 618, outputs of the piezoelectric layer, thermopile layer and/or loop sensor are monitored. At 622, the method determines whether a conductive loop is broken or predetermine threshold (thermal or impact) is exceeded. If 622 is false, the method returns to 610. If 622 is true, the method continues at 626 and the sensing assembly transmits a message to the vehicle. At 630, the method determines whether TDR is enabled. If 630 is false, the method ends. If 630 is true, the method performs TDR to determine distances to the damage at 634 and transmits the distances to the vehicle at 638.

Figure 11:
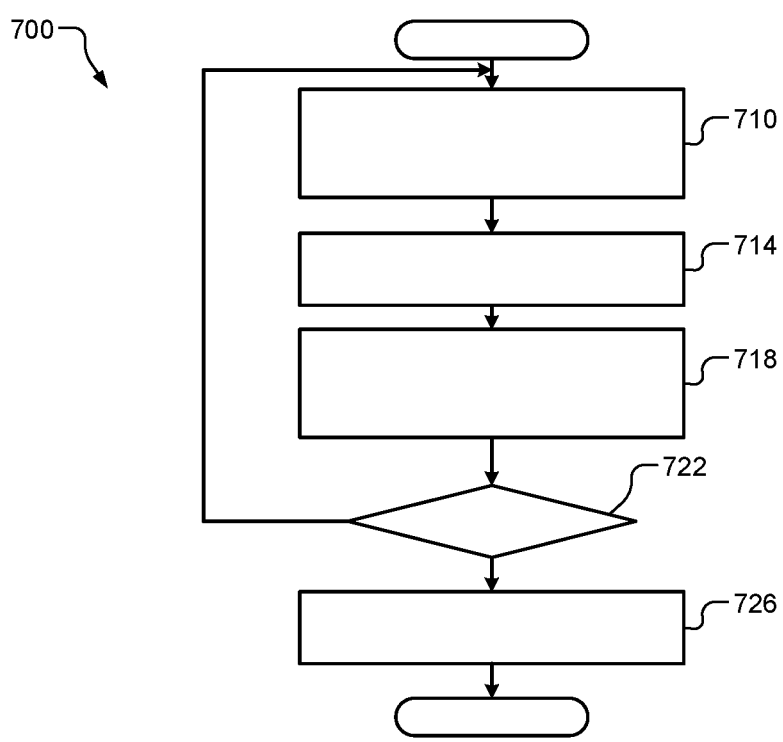

Referring now to FIG. 11, a method 700 for monitoring thermal events is shown. At 710, the sensing assembly generates power using a thermopile. At 714, power is harvested and/or stored. At 718, the temperature is sensed using the thermopile. At 722, the method determines whether the measured temperature is greater than one or more predetermined thresholds. If 722 is true, the method transmits the measured temperature to the vehicle at 726.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A composite panel for a vehicle, comprising:
a plurality of layers bonded together by resin; and
a sensing assembly arranged between at least two of the plurality of layers and including:
   at least one of a piezoelectric layer to sense vibration of the composite panel when installed on the vehicle and a thermopile configured to sense changes in temperature of the composite panel when installed on the vehicle; and
   a transmitter configured to transmit data to the vehicle based on an output of the at least one of the piezoelectric layer and the thermopile; and
a comparing circuit in communication with the at least one of the piezoelectric layer and the thermopile and configured to compare an output of the at least one of the piezoelectric layer and the thermopile to one or more predetermined thresholds, wherein the transmitter is configured to selectively transmit the data to the vehicle in response to the comparison to display an indication of damage to at least one of the plurality of layers through an infotainment display or transmit the indication of damage to the at least one of the plurality of layers remotely from the vehicle.

2. The composite panel of claim 1, further comprising a controller including the comparing circuit.

3. The composite panel of claim 2, further comprising L conductive loops arranged between at least two of the plurality of layers and in communication with the controller, where L is an integer greater than zero.

4. The composite panel of claim 3, wherein the controller further comprises a time domain reflectometry (TDR) circuit configured to determine a distance from the controller to damage to at least one of the L conductive loops.

5. The composite panel of claim 4, wherein the controller includes a loop sensor configured to sense a parameter of the L conductive loops.

6. The composite panel of claim 5, wherein the parameter is selected from a group consisting of current, voltage and resistance.

7. The composite panel of claim 5, wherein the controller selectively identifies damage to at least one of the L conductive loops in response to the parameter.

8. The composite panel of claim 1, further comprising an energy harvesting circuit configured to harvest power from the at least one of the piezoelectric layer and the thermopile.

9. The composite panel of claim 8, further comprising an energy storage device, wherein the energy harvesting circuit is configured to supply the power to the energy storage device.

10. The composite panel of claim 9, wherein the energy storage device comprises at least one of a battery and a supercapacitor.

11. The composite panel of claim 1, further comprising a reference generator configured to generate the one or more predetermined thresholds.

12. The composite panel of claim 1, further comprising:
an energy storage device;
a radio frequency identification (RFID) circuit configured to receive power from a remote transmitter; and
an energy harvesting circuit configured to harvest power from the RHO circuit and to store the power in the energy storage device,
wherein the transmitter is connected to the energy storage device.

13. A composite panel for a vehicle, comprising:
a plurality of layers bonded together by resin; and
a sensing assembly, arranged between at least two of the plurality of layers, comprising:
   a radio frequency identification (RFID) circuit configured to receive power from a remote transmitter;
   an energy storage device;
   an energy harvesting circuit configured to harvest the power from the RFID circuit and to store the power in the energy storage device;
   at least one of a piezoelectric layer and a thermopile;
   a controller in communication with the energy storage device and the at least one of the piezoelectric layer and the thermopile and configured to compare an output of the at least one of the piezoelectric layer and the thermopile to one or more predetermined thresholds; and
   a transmitter in communication with the controller and the energy harvesting circuit and configured to selectively transmit a message to the vehicle in response to the comparison;
   L conductive loops arranged between at least two of the plurality of layers and in communication with the controller, where L is an integer greater than zero; and
   a loop sensor configured to send a digital code on one end of each conductive loop, sense a signal received at the other end of the conductive loop, compare the received signal to the digital code, and determine a state of the conductive loop based on the comparison to selectively identify damage to at least one of the L conductive loops.

14. The composite panel of claim 13, wherein the loop sensor is configured to sense a parameter of the L conductive loops.

15. The composite panel of claim 14, wherein the parameter is selected from a group consisting of current, voltage and resistance.

16. The composite panel of claim 14, wherein the controller selectively identifies damage to at least one of the L conductive loops in response to the parameter.

17. The composite panel of claim 13, wherein the energy storage device comprises at least one of a battery and a supercapacitor.

18. A composite panel for a vehicle, comprising:
a plurality of layers bonded together by resin; and
a sensing assembly, arranged between at least two of the plurality of layers, comprising:
   a radio frequency identification (RFID) circuit configured to receive power from a remote transmitter;
   an energy storage device;
   an energy harvesting circuit configured to harvest the power from the RFD circuit and to store the power in the energy storage device;
   at least one of a piezoelectric layer and a thermopile;
   a controller in communication with the energy storage device and the at least one of the piezoelectric layer and the thermopile and configured to compare an output of the at least one of the piezoelectric layer and the thermopile to one or more predetermined thresholds;
   L conductive loops arranged between at least two of the plurality of layers and in communication with the controller, where L is an integer greater than zero; and a transmitter in communication with the controller and the energy harvesting circuit and configured to selectively transmit a message to the vehicle in response to the comparison, wherein the controller further comprises a time domain reflectometry (TDR) circuit configured to determine a distance from the controller to damage to at least one of the L conductive loops.

* * * * *